(12) United States Patent
Worfolk

(10) Patent No.: US 9,430,097 B2
(45) Date of Patent: Aug. 30, 2016

(54) NON-ORTHOGONAL CODING TECHNIQUES FOR OPTICAL SENSING

(71) Applicant: Synaptics Incorporated, San Jose, CA (US)

(72) Inventor: Patrick Worfolk, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 333 days.

(21) Appl. No.: 14/042,498

(22) Filed: Sep. 30, 2013

(65) Prior Publication Data

US 2015/0091872 A1    Apr. 2, 2015

(51) Int. Cl.
    *G06F 3/042*    (2006.01)
    *G06F 3/041*    (2006.01)

(52) U.S. Cl.
    CPC .......... *G06F 3/0428* (2013.01); *G06F 3/0416* (2013.01)

(58) Field of Classification Search
    CPC ............... G06F 3/0421; G06F 2203/04109; G06F 3/0428; G06F 3/0416
    USPC ................... 345/175; 356/3.1–5.04
    See application file for complete search history.

(56) References Cited

U.S. PATENT DOCUMENTS

| | | |
|---|---|---|
| 4,254,333 A | 3/1981 | Bergstrom |
| 4,305,071 A | 12/1981 | Bell et al. |
| 4,346,376 A | 8/1982 | Mallos |
| 4,672,195 A * | 6/1987 | Golborne ............. G06F 3/0421 250/221 |
| 4,672,364 A | 6/1987 | Lucas |
| 4,761,637 A | 8/1988 | Lucas et al. |
| 4,891,508 A | 1/1990 | Campbell |
| 4,893,120 A | 1/1990 | Doering et al. |
| 4,933,544 A | 6/1990 | Tamaru |
| 4,953,806 A | 9/1990 | Rothenpieler et al. |
| 5,160,837 A * | 11/1992 | Hirane ...................... B41J 2/45 250/208.2 |
| 5,801,681 A | 9/1998 | Sayag |
| 6,480,187 B1 | 11/2002 | Sano et al. |
| 6,765,193 B2 | 7/2004 | Sumriddetchkajorn |
| 6,972,753 B1 | 12/2005 | Kimura et al. |
| 7,394,058 B2 | 7/2008 | Chua et al. |
| 7,432,893 B2 | 10/2008 | Ma et al. |
| 7,471,865 B2 | 12/2008 | Graham |
| 7,520,050 B2 | 4/2009 | Graham |
| 7,868,874 B2 | 1/2011 | Reynolds |
| 8,605,262 B2 * | 12/2013 | Campbell ............. G01S 17/325 356/4.01 |
| 2005/0024065 A1 | 2/2005 | Umeda et al. |
| 2005/0073324 A1 | 4/2005 | Umeda et al. |
| 2005/0122785 A1 | 6/2005 | Umeda et al. |

(Continued)

*Primary Examiner* — Kumar Patel
*Assistant Examiner* — Vinh Lam
(74) *Attorney, Agent, or Firm* — Osha Liang LLP

(57) ABSTRACT

A processing system includes a transmitter module, a receiver module, and a determination module. The transmitter module includes drives a first optical transmitter with a first optical coded signal based on a first code, and drives a second optical transmitter with a second optical coded signal based on a second code. The first code and the second code are non-orthogonal, and the first optical transmitter and the second optical transmitter transmit at overlapping times. The receiver module receives a resulting signal that includes effects corresponding to the first optical coded signal and the second optical coded signal. The determination module determines a first measurement between the first optical transmitter and the optical receiver, determines a second measurement between the second optical transmitter and the optical receiver, and determines positional information for an input object based on the first measurement and the second measurement.

16 Claims, 7 Drawing Sheets

(56) References Cited

U.S. PATENT DOCUMENTS

| | | | |
|---|---|---|---|
| 2006/0114237 A1 | 6/2006 | Crockett et al. | |
| 2007/0034783 A1 | 2/2007 | Eliasson et al. | |
| 2008/0158167 A1 | 7/2008 | Hotelling et al. | |
| 2008/0252619 A1 | 10/2008 | Crockett et al. | |
| 2009/0153519 A1 | 6/2009 | Suarez Rovere | |
| 2009/0167724 A1 | 7/2009 | Xuan et al. | |
| 2009/0189867 A1 | 7/2009 | Krah et al. | |
| 2010/0059295 A1 | 3/2010 | Hotelling et al. | |
| 2010/0060591 A1 | 3/2010 | Yousefpor et al. | |
| 2010/0079411 A1* | 4/2010 | Lee | G06F 3/03547 345/175 |
| 2010/0128247 A1* | 5/2010 | Heizmann | G01S 7/484 356/5.01 |
| 2011/0122091 A1* | 5/2011 | King | G06F 3/0421 345/175 |
| 2011/0147569 A1* | 6/2011 | Drumm | G06F 3/0421 250/208.6 |
| 2011/0227874 A1* | 9/2011 | Fahraeus | G06F 3/0421 345/175 |
| 2012/0026134 A1* | 2/2012 | Ehrlich | G06F 3/0425 345/175 |
| 2012/0086672 A1* | 4/2012 | Tseng | G06F 3/0421 345/175 |
| 2012/0249485 A1* | 10/2012 | Ye | G06F 3/0421 345/175 |
| 2012/0268403 A1* | 10/2012 | Christiansson | G06F 3/042 345/173 |
| 2013/0131473 A1* | 5/2013 | Gu | G06F 3/0421 600/324 |
| 2013/0141389 A1* | 6/2013 | Chou | G06F 3/0425 345/175 |
| 2013/0285946 A1* | 10/2013 | Nordahl | G06F 3/041 345/173 |
| 2014/0168165 A1* | 6/2014 | Liou | G06F 3/0304 345/175 |
| 2014/0192024 A1* | 7/2014 | Holz | H04N 5/23241 345/175 |
| 2014/0313167 A1* | 10/2014 | Cohen | G06F 3/0426 345/175 |
| 2015/0002470 A1* | 1/2015 | Zhu | G06F 3/0428 345/175 |
| 2015/0062087 A1* | 3/2015 | Cho | G02F 1/13338 345/175 |

* cited by examiner

NON-ORTHOGONAL CODING TECHNIQUES FOR OPTICAL SENSING

FIELD OF THE INVENTION

The invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, embodiments relate to a processing system for optical sensing that includes a transmitter module, a receiver module, and a determination module. The transmitter module includes transmitter circuitry coupled to a first optical transmitter and a second optical transmitter, the transmitter module is configured to drive the first optical transmitter with a first optical coded signal based on a first code, and drive the second optical transmitter with a second optical coded signal based on a second code. The first code and the second code are non-orthogonal, and the first optical transmitter and the second optical transmitter transmit at overlapping times. The receiver module is coupled to an optical receiver and configured to receive a resulting signal that includes effects corresponding to the first optical coded signal and effects corresponding to the second optical coded signal. The determination module is configured to determine a first measurement between the first optical transmitter and the optical receiver based on the resulting signal and the first code, determine a second measurement between the second optical transmitter and the optical receiver based on the second code and the resulting signal, and determine positional information for an input object based on the first measurement and the second measurement.

In general, in one aspect, embodiments relate to a method for optical sensing. The method includes receiving a resulting signal including effects corresponding to a first optical coded signal transmitted from a first optical transmitter to a first optical receiver and effects corresponding to a second optical coded signal transmitted from a second optical transmitter to the first optical receiver. The first optical coded signal is transmitted based on a first code, and the second optical coded signal is based on a second code. The first code and the second code are non-orthogonal, and the first optical transmitter and the second optical transmitter transmit at overlapping times. The method further includes determining a first measurement between the first optical transmitter and the optical receiver based on the resulting signal and the first code, determining a second measurement between the second optical transmitter and the first optical receiver based on the second code and the resulting signal, and determining positional information for an input object based on the first measurement and the second measurement.

In general, in one aspect, embodiments relate to an input device that includes optical transmitters each configured to transmit an optical signal according to a non-orthogonal code of a group of non-orthogonal codes during a time period. The optical transmitters transmit the optical signal during overlapping times in the time period. The input device further includes an optical receiver configured to receive an aggregated input signal for the time period. The aggregated input signal comprises the optical signal from the optical transmitters. The input device further includes a processing system configured to determine, for each of the optical transmitters, an individual input signal from the optical transmitter using the aggregated input signal and the non-orthogonal codes.

Other aspects of the invention will be apparent from the following description and the appended claims.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Various embodiments of the present invention provide input devices and methods that facilitate improved usability. In general, one or more embodiments of the invention provide a method and apparatus for driving an optical transmitter with a pseudorandom noise (PN) code and obtaining positional information based on resulting signals from the PN code. In some embodiments, the PN code is one member of multiple non-orthogonal codes and multiple optical transmitters transmit a signal at overlapping times. In such embodiments, an individual input signal from an optical transmitter is determined from an aggregated input signal, which includes signals received by the optical receiver from the multiple transmitters. The individual input signal is used to determine positional information from an input object.

Figure 1:
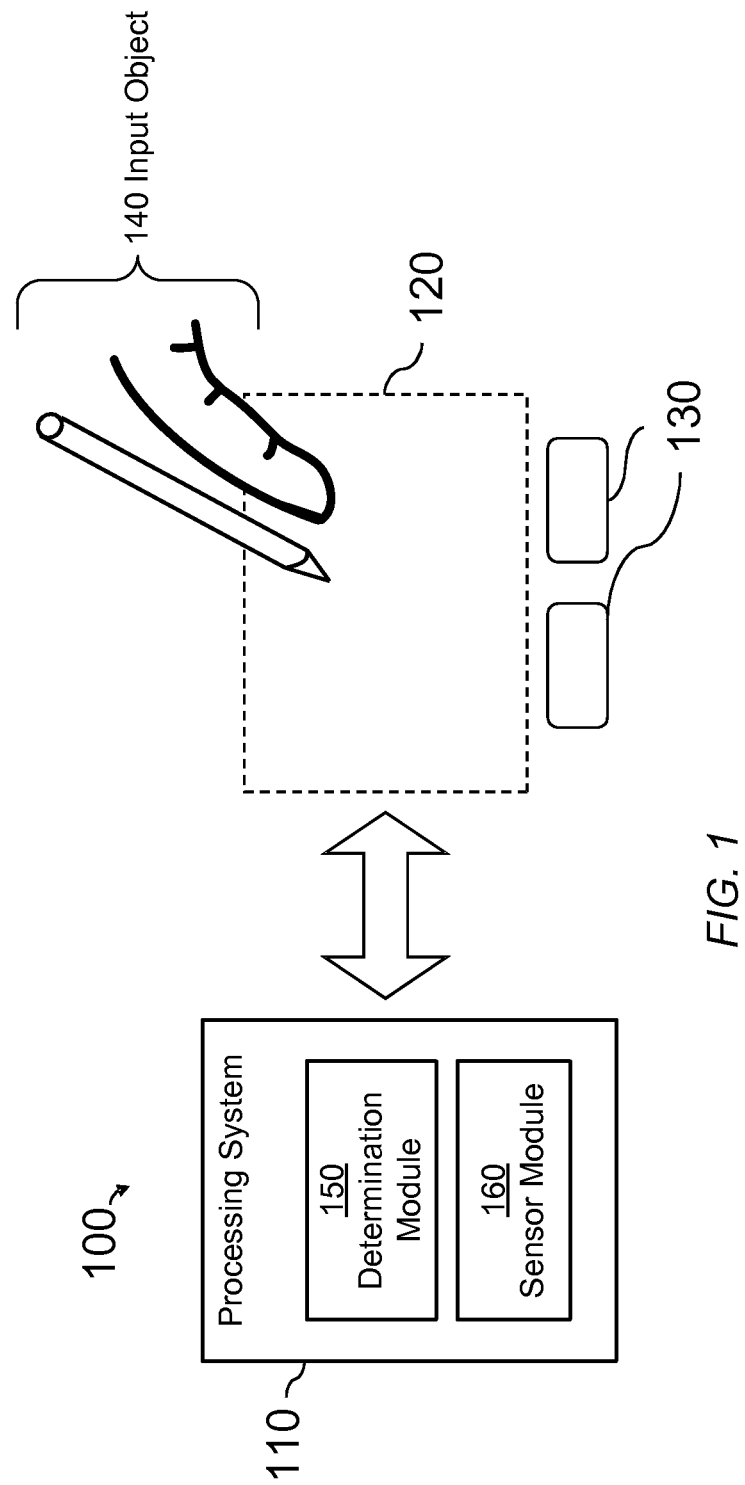
FIGS. 1 and 2 show schematic diagrams in accordance with one or more embodiments of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad", "touch screen", or a "touch sensor device") configured to sense input provided by one or more input objects (140) in a sensing region (120). Example input objects include fingers and styli, as shown in FIG. 1.

Sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment. In some embodiments, the sensing region (120) extends from a surface of the input device (100) in one or more directions into space until signal-to-noise ratios prevent sufficiently accurate object detection. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that includes no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may include effect(s) corresponding to one or more transmitter signals, and/or to one or more sources of environmental interference (e.g. other electromagnetic signals). A resulting signal may also be referred to as an input signal. Sensor electrodes may be dedicated transmitters or receivers, or may be configured to both transmit and receive.

Some optical techniques utilize optical sensing elements (e.g., optical transmitters and optical receivers). Such optical transmitters transmit optical transmitter signals. The optical transmitter signals may be referred to as optical coded signals. The optical receivers include functionality to receive resulting signals from the optical transmitter signals. A resulting signal may include effect(s) corresponding to one or more transmitter signals, one or more input objects (140) in the sensing region, and/or to one or more sources of environmental interference. For example, the optical transmitters may correspond to a light emitting diode (LED), organic LED (OLED), light bulb, or other optical transmitting component. In one or more embodiments, the optical transmitter signals are transmitted on the infrared spectrum. In one or more embodiments of the invention, the input device is a frustrated total internal reflection device. In one or more embodiments of the invention, a frustrated total reflection device is a device in which optical signals reflect light internally and, generally, does not allow the light to escape. Introducing an input object to the sensing region causes the light to escape at the position in which the input object is added.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes). In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to sensing element(s) of input device (100), and one or more components elsewhere. For example, the input device (100) may be a peripheral coupled to a desktop computer, and the processing system (110) may include software configured to run on a central processing unit of the desktop computer and one or more ICs (perhaps with associated firmware) separate from the central processing unit. As another example, the input device (100) may be physically integrated in a phone, and the processing system (110) may include circuits and firmware that are part of a main processor of the phone. In some embodiments, the processing system (110) is dedicated to implementing the input device 100. In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when an input object is in a sensing region, determine signal to noise ratio, determine positional information of an input object, determine a type of input object, perform other determinations, or a combination thereof.

The sensor module (160) may include functionality to drive the sensing elements to transmit transmitter signals and receive resulting signals. For example, the sensor module (160) may include sensory circuitry that is coupled to the sensing elements. The sensor module (160) may include, for example, transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures such as mode changing gestures, and mode changing modules for changing operation modes.

In some embodiments, the processing system (110) responds to user input (or lack of user input) in the sensing region (120) directly by causing one or more actions. Example actions include changing operation modes, as well as GUI actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system (110).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s) (502), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 2:
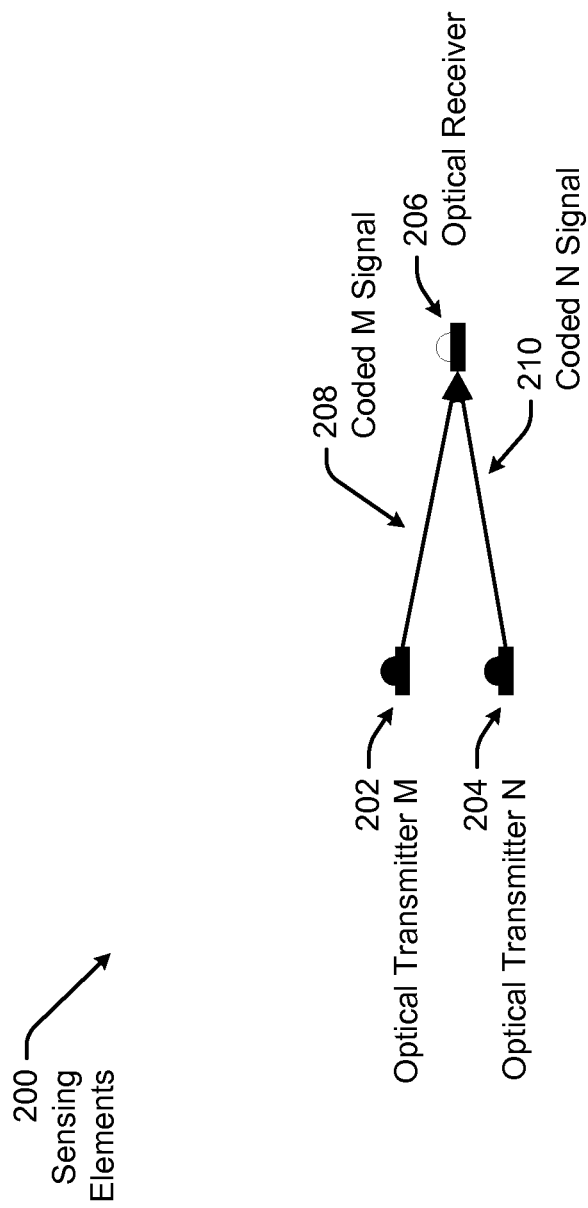

FIG. 2 shows a schematic diagram of a system in accordance with one or more embodiments of the invention. Specifically, FIG. 2 shows example sensing elements (200), such as the sensing elements driven by the sensor module in FIG. 1. As shown in FIG. 2, the sensing elements (200) include optical transmitters (e.g., optical transmitter M (202), optical transmitter N (204)) and one or more optical receivers (e.g., optical receiver (206)). An optical transmitter includes functionality to transmit an optical coded signal (e.g., coded M signal (208), coded N signal (210)). The optical receiver (206) includes functionality to receive resulting signals or input signals created by the optical coded signal. In one or more embodiments of the invention, the optical transmitters are infrared transmitters that transmit infrared light. The optical receivers are infrared receivers that detect infrared light. In one or more embodiments of the invention, the optical coded signal is a signal that is specified by and conforms to a code.

In one or more embodiments of the invention, the code is a pseudorandom noise (PN) code. The PN code is defined by a PN sequence. A PN sequence is a binary sequence that at least appears random. In other words, the PN sequence at least approximates the properties of being random. Apparent randomness may be with respect to someone who does not know all the inputs to generate the pseudorandom sequence and/or does not know the operations to generate the pseudorandom sequence in accordance with one or more embodiments of the invention. In one or more embodiments of the invention, a PN sequence may be a defined length. A PN code is a coded form of the PN sequence.

By way of one non-limiting example, the PN sequence may include a sequence of bits, whereby each bit represents a time unit having a single on state, a single off state, and a transition between the two states. An on state is the optical transmitter transmitting light while an off state is the optical transmitter not transmitting light. The optical code element from off state to on state may be denoted as "+1" and the optical code element from on state to off state may be denoted at "−1". In the example, a bit having a value of "0" in the PN sequence may be encoded by "−1" while a bit having a value of "1" in the PN sequence may be encoded by "+1". Alternatively, in the example, the opposite encoding of "0"s and "1"s may be used.

By way of another non-limiting example, subsequences of bits in the PN sequence may be encoded into an intensity of light transmitted by the transmitter. In the example, for example, "00" may be encoded as off, "01" may be encoded to be one third of full intensity of light, "10" may be encoded to two thirds of full intensity, while "11" may be encoded as full intensity of light. Other mappings between one or more PN sequences and one or more optical coded signals may be used without departing from the scope of the invention.

In one or more embodiments of the invention, the PN sequence may be a maximal length sequence. A maximal length sequence is a pseudorandom binary sequence that is generated using a maximal linear feedback shift register. For a length-m shift register, the sequence generated has length $2^{m-1}$ and has an almost equal number of "0's" as "1's". In one or more embodiments of the invention, circuitry in the input device includes a linear feedback shift register that is configured to create a maximal length sequence. The maximal length sequence may alternatively be generated in software or firmware or stored in a lookup table.

In one or more embodiments of the invention, two or more optical transmitters may each transmit an optical coded signal at overlapping times during a time period. In other words, if the time period is the amount of time for each optical transmitter to transmit optical coded signals derived from a single iteration of non-orthogonal codes, then at various times during the time period multiple optical transmitters are simultaneously in an on state. At other times during the time period, one or more optical transmitters that were in the on state are in an off state. The optical coded signal transmitted at each transmitter may be derived from a PN sequence associated with the transmitter. Unless the PN sequence and coding is chosen with great care, the resulted coded signals will, with a high probability, be non-orthogonal. One or more embodiments of the invention use non-orthogonal coded signals.

In some embodiments of the invention, the non-orthogonal codes may be a cyclically shifted version of the same code. By way of one non-limiting example, a single code may be generated. In the example, a first optical transmitter may transmit optical coded signals based on the single code, a second optical transmitter may transmit optical coded signals based on the single code cyclically shifted by a time unit, a third optical transmitter may transmit optical coded signals based on the single code cyclically shifted by two time units, and so forth. The length of the code may be configurable. The number of transmitters simultaneously transmitting may be configurable.

The code by which the optical coded signal is transmitted may have a combination of two or more properties discussed above. For example, the code may be a PN code that is a non-orthogonal code, which is cyclically time shifted. Additionally or alternatively, the code may be based on a maximal length sequence. Other combinations of the properties discussed above may be used without departing from the scope of the invention. If a maximal length sequence is coded so that "0's" map to "−1's" and "1's" map to "+1's", then the autocorrelation function of the resulting coded sequence is one for zero delay and $1/(2^{m-1})$ for non-zero delay. Thus, maximal length sequences are non-orthogonal to shifted versions of themselves. Maximal length sequences have compact representations through linear feedback shift registers and are available in lengths of $2^{m-1}$, where m is length of the shift register. In one or more embodiments of the invention, the compact representations of maximal length sequences are used.

While FIGS. 1 and 2 show a configuration of components, other configurations may be used without departing from the scope of the invention. For example, various components may be combined to create a single component. As another example, the functionality performed by a single component may be performed by two or more components.

Figure 3:
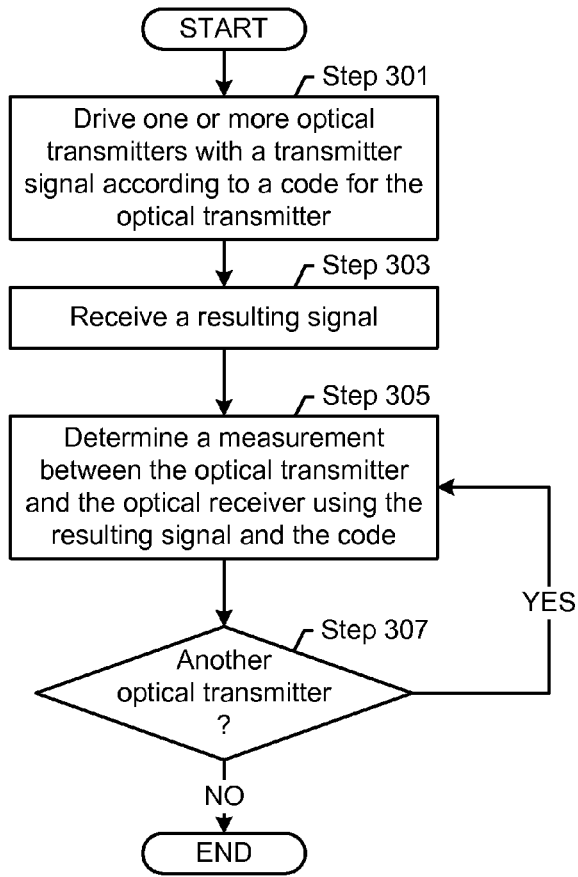
FIGS. 3-5 show flowcharts in accordance with one or more embodiments of the invention.
Figure 4:
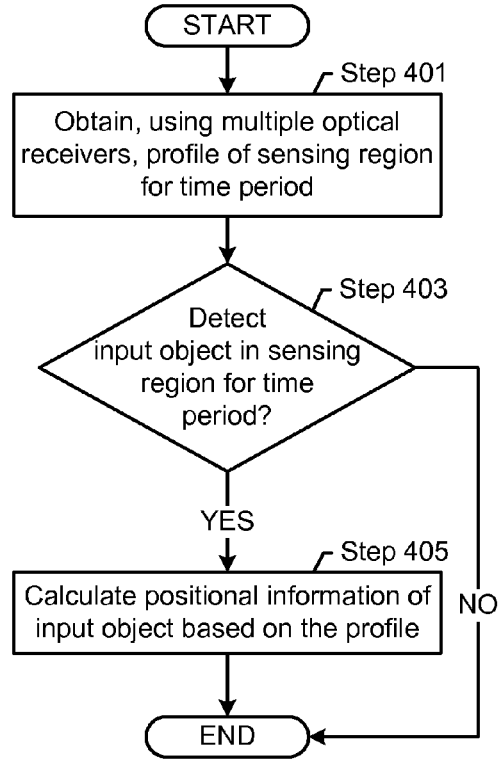
Figure 5:
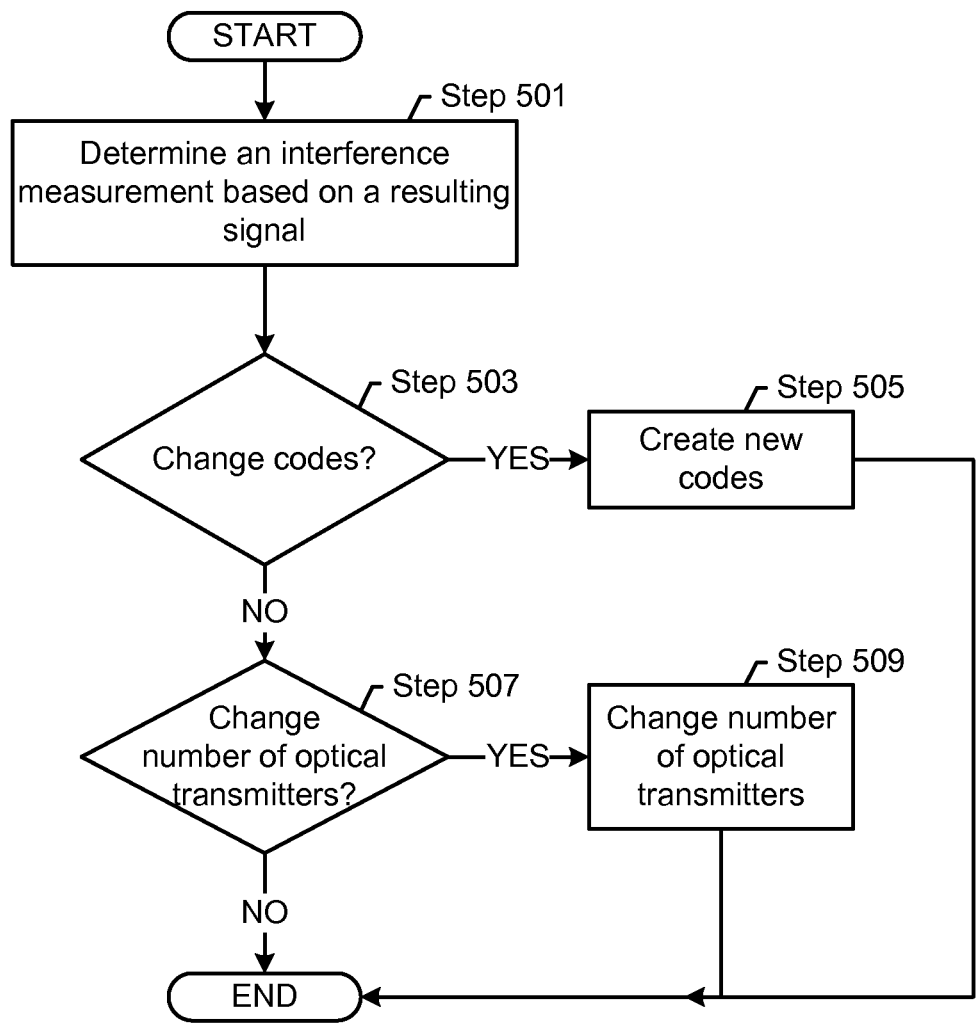

FIGS. 3-5 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In Step 301, one or more optical transmitters with a transmitter signal are driven according to a code for each optical transmitter. In one or more embodiments of the invention, a code is assigned to the optical transmitter. The code may be one or more of the codes discussed above with reference to FIG. 2. The transmitter module drives the optical transmitter with the optical coded signal based on the code assigned to the optical transmitter. In other words, the optical transmitter outputs the optical coded signal during the time period in conformance to the code. More specifically, the transmitter module may drive each optical transmitter to switch between on and off or various intensities as defined by the assigned code. In one or more embodiments of the invention, the transmitter module drives multiple optical transmitters during the same time period. Thus, at any particular moment in time, more than one optical transmitter may be actively transmitting.

In Step 303, a resulting signal is received in accordance with one or more embodiments of the invention. In one or more embodiments of the invention, the optical receiver receives the resulting signal and transmits information about the resulting signal to the receiver module. The resulting signal includes effects corresponding to the optical coded signals from one or more transmitters.

In Step 305, a measurement between an optical transmitter and the optical receiver is determined using the resulting signal and the code in accordance with one or more embodiments of the invention. In one or more embodiments of the invention, the measurement is determined individually on a per optical transmitter basis. In other words, the measurement reflects the effects of the optical coded signal from a particular optical transmitter. If an input object is in the sensing region and between the particular optical transmitter and optical receiver, the measurement may further include the effects of the input object.

By way of one non-limiting example, obtaining the measurement may be based on identifying the expected resulting signal for each time unit during the time period. The expected resulting signal is the signal when no input object is in the sensing region. From the expected resulting signals across the time units in the time period and the actual signals, an estimation is made as to individual input signal from the particular optical transmitter for the entire time period.

In a more specific example in which a PN sequence is used that is cyclically shifted for the optical transmitters, the following equations may be used in accordance with one or more embodiments of the invention. The measured signal intensity at a particular time unit i is $$y[i] = \left( \sum_{j=1}^{N_{TX}} x[j]p[i-j+1] \right) + \varepsilon_i,$$

where y[i] is the difference in intensity of light received before and after the transition in the time unit, j is an iterator for iterating over the active optical transmitters, $N_{TX}$ is the number of active optical transmitters, x[j] is the difference in intensity of received signal before and after the transition in the time unit from transmitter j, p[i−j+1] is the value of the coded PN sequence at position i−j+1, and $\epsilon_i$ is the noise in the intensity measurement at time unit i. In the example, the estimated individual input signal may be calculated using $N_{PN}$ measurements using $$\hat{x}[j] = \frac{1}{N_{PN}}\left(\sum_{i=1}^{N_{PN}} y[j]p[i-j+1]\right),$$

where $\hat{x}[j]$ is the estimated signal from transmitter j, $N_{PN}$ is the length of the PN sequence, and the remaining variables are the same as those discussed with respect to the previous equation.

The above is only one example technique for obtaining the measurement. Other techniques may be used without departing from the scope of the invention. For example, if a non-PN sequence is used or the PN sequence is not cyclically shifted, p[i−j+1] may be replaced with another value of the code by a particular transmitter. Thus, embodiments are not intended to be limited to the particular equations discussed above.

In Step 307, a determination is made whether another optical transmitter exists that may have contributed to the resulting signal. If another optical transmitter exists, then the method may repeat with Step 305 for the next optical transmitter.

FIG. 4 shows a flowchart for calculating positional information in accordance with one or more embodiments of the invention. In Step 401, using multiple optical receivers, a profile of the sensing region is obtained for the time period. In one or more embodiments of the invention, the profile reflects the measured value from each optical receiver and for each transmitter. One or more profiles may be processed to maintain a baseline that is an estimate of the light intensity expected from one or more transmitters at each receiver. Processing may be performed based on interference or noise.

In Step 403, a determination is made whether an input object is detected in the sensing region for the time period in accordance with one or more embodiments of the invention. Detecting an input object in the sensing region may be based on whether a change from the baseline to the measured valued exists. The input object may be detected, for example, if the change is greater than a threshold value and/or if the change and/or profile comply with other criteria. Additionally or alternatively, the value of the baseline as compared to the signal to noise ratio (SNR) may be used to detect the existence of the input object.

If an input object is not detected in the sensing region, then the method may proceed to end for the current time period. Although the method may end with respect to any input object, additional processing may be performed using the profile, such as adjusting the baseline, without departing from the scope of the invention.

In Step 405, if an input object is detected in the sensing region, positional information is calculated based on the profile in accordance with one or more embodiments of the invention. In particular, because the measured value in the profile reflects the effects of an optical coded signal from a particular optical transmitter to a particular optical receiver, a change in value from the transmitted value indicates that the input object interferes with the signal and is, therefore, in between or close enough to affect the particular optical transmitter and optical receiver. By combining the information from a variety of combinations of optical transmitters and optical receivers, a map of the sensing region may be created that pinpoints the position of the input object in the sensing region. Additional information, such as the strength of the signal, may also be used to calculate positional information. Other techniques for calculating positional information may be used without departing from the scope of the invention, including techniques that are based on a tomographic reconstruction.

FIG. 5 shows a flowchart for configuring the transmitter module in accordance with one or more embodiments of the invention. In Step 501, an interference measurement is determined based on a resulting signal in accordance with one or more embodiments of the invention. For example, one type of interference measurement that may be used is effective SNR. Effective SNR is the SNR after signal processing. If the effective SNR is not optimal, then the code or number of optical transmitters may be changed.

In Step 503, a determination is made whether to change codes. For example, the code may be changed periodically or incrementally. By way of another example, a new code may be created that is longer or shorter than the prior code. In the example, lengthening the code may be performed based on the interference measurement indicating high amount of interference in order to minimize the occurrence of falsely detecting input objects or not detecting an existing input object. Further, shortening the code may be performed to increase the frame rate (i.e., shorten the amount of time to scan the entire sensing region) and improve performance. Determining whether to increase or decrease the length of the code may be based on the relative location of the interference measurement with respect to a high threshold and a low threshold.

If a determination is made to change codes, then a new code is created in accordance with one or more embodiments of the invention in Step 505. Creating the new code may include specifying the length and creating a sequence matching the specified length. Further, a code is generated based on the sequence. Specifying the length and creating the sequence may be performed by the determination module, the transmitter module, the receiver module, or any other module or combination thereof. After the new code is created, coded signals are transmitted according to the new code. In particular, the optical transmitter transmits optical coded signals according to the new code. The determination module may use the new code to attribute the effects of the resulting signal to the particular optical transmitter.

In Step 507, a determination is made whether to change the number of optical transmitters in accordance with one or more embodiments of the invention. Specifically, a determination is made whether to adjust the number of optical transmitters that transmit during a single time period. The number of optical transmitters that transmit may be adjusted, for example, based on the interference measurement. If the interference measurement indicates a large amount of interference, then the number of optical transmitters may be decreased. In other words, a first subset of optical transmitters transmit during a first time period, then a second subset of optical transmitters transmit during a second time period, then a third subset of optical transmitters transmit during a third time period, and so forth until all optical transmitters have transmitted. Decreasing the number of optical transmitters that transmit simultaneously reduces parallelization and, thereby, increases the number of subsets and decreases the frame rate.

If the interference measurement indicates a low amount of interference, then the number of optical transmitters may be increased. In other words, increasing the number of optical transmitters that transmit simultaneously increases parallelization and, thereby, decreases the number of subsets and increases the frame rate. Determining whether to increase or decrease the number of optical transmitters may be based on the relative location of the interference measurement with respect to a high threshold and a low threshold.

If a determination is made to adjust the number of optical transmitters, then the number of optical transmitters is changed in Step 509 in accordance with one or more embodiments of the invention. In particular, the transmitter module may adjust the number of optical transmitters that are driven during the time period.

Although FIG. 5 shows adjusting either the code or the number of transmitters, both the code and the number of transmitters may be adjusted based on the same interference measurement. Further, additional adjustments may be made without departing from the scope of the invention.

Figure 6:
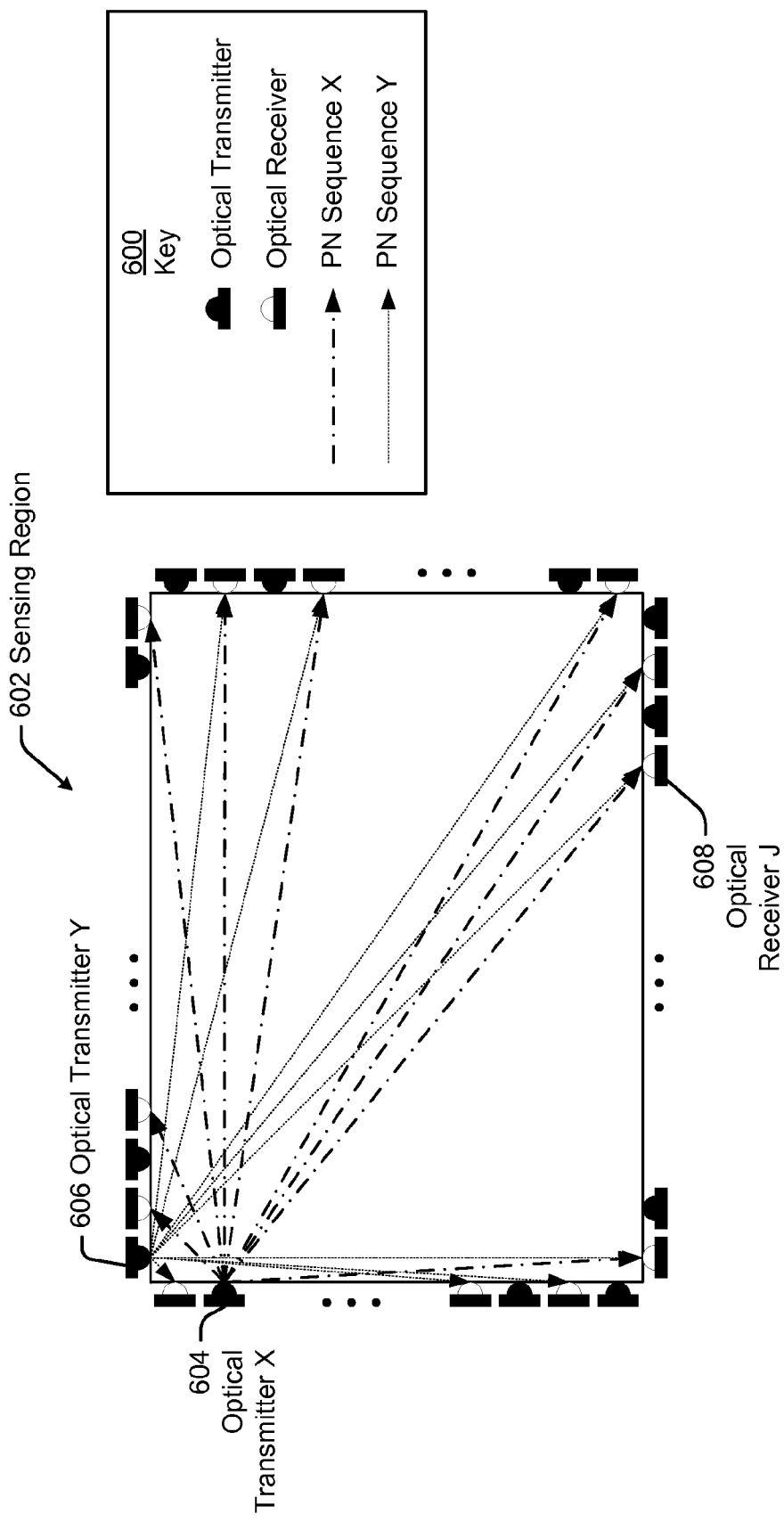
FIGS. 6 and 7 show example sensing regions in accordance with one or more embodiments of the invention.
Figure 7:
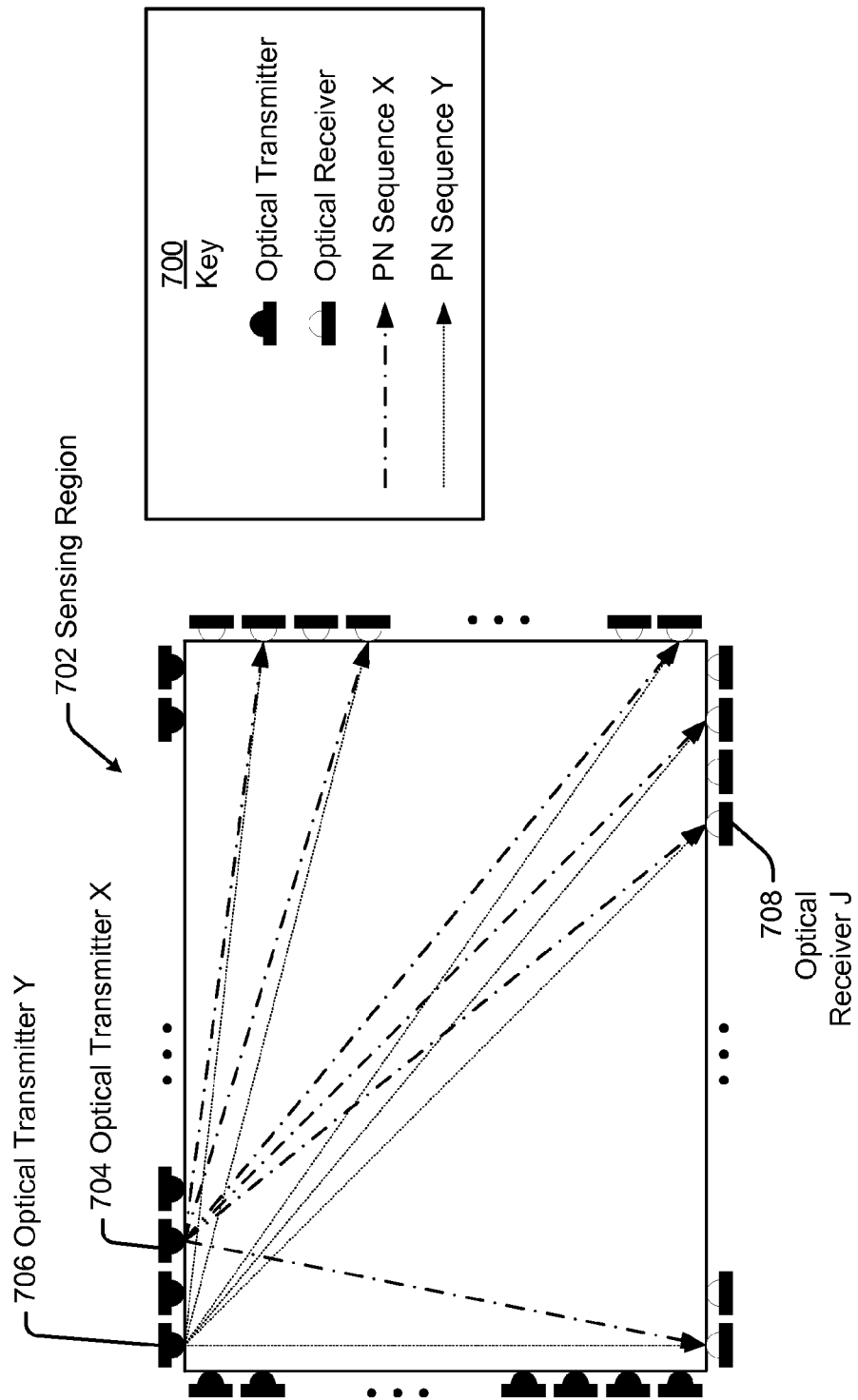
Figure 8:
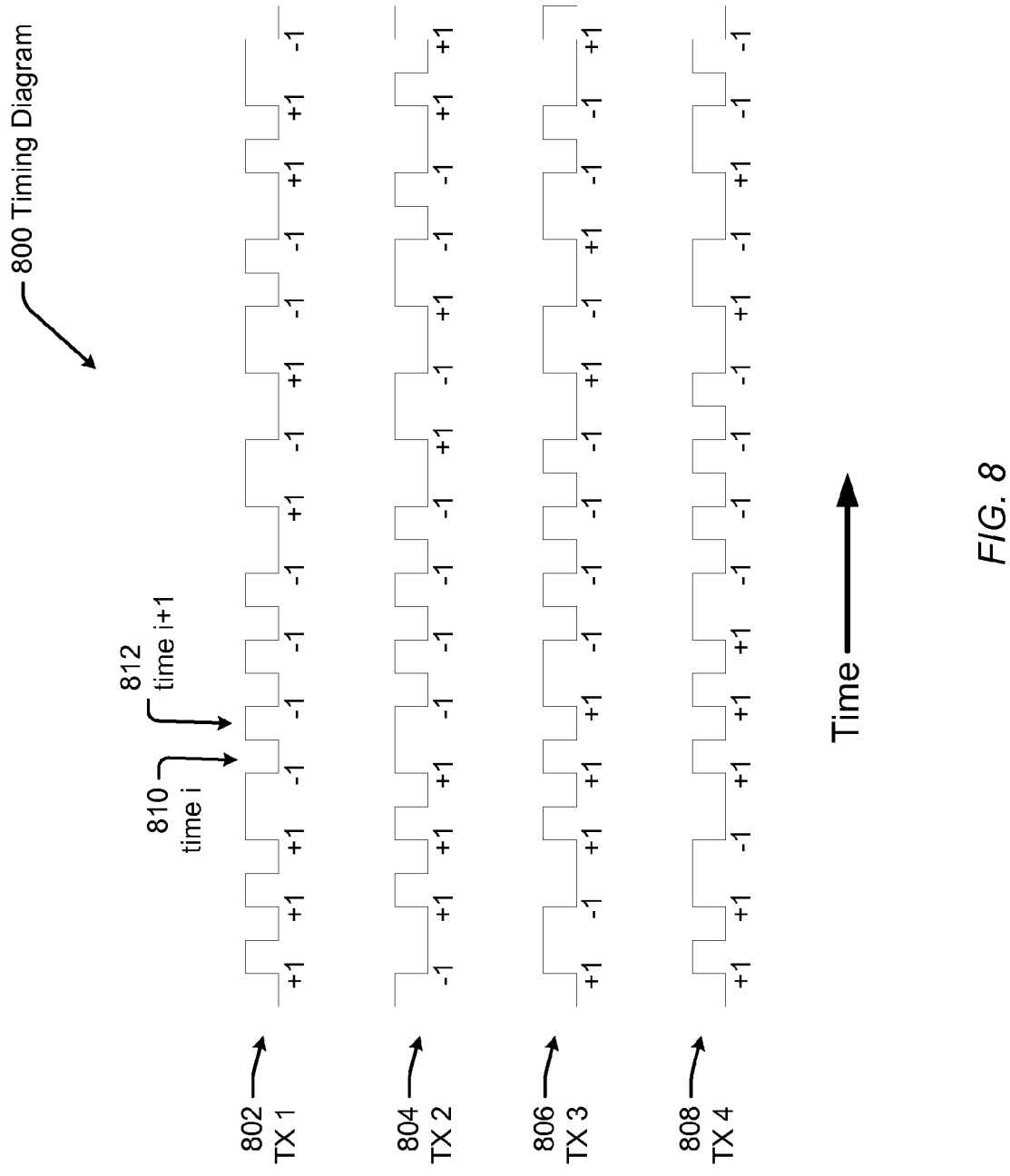
FIG. 8 shows example pseudorandom noise sequence transmissions in accordance with one or more embodiments of the invention.

FIGS. 6-8 show examples in accordance with one or more embodiments of the invention. The following examples are for explanatory purposes only and not intended to limit the scope of the invention. FIGS. 6 and 7 show example sensing regions in accordance with one or more embodiments of the invention. Turning to FIG. 6, as shown by the key (600) and the sensing region (602), optical transmitters and optical receivers may be arranged in an alternating pattern around the sensing region. Further, as shown in FIG. 6, optical transmitters may transmit simultaneously. In the example FIG. 6, optical transmitter X (604) transmits a coded signal in accordance with PN sequence X at the same time as optical transmitter Y (606) transmitting a coded signal in accordance with PN sequence Y. Thus, the resulting signals received by optical receiver J (608) include the aggregation of the effects of the transmissions from optical receiver X (604) and optical receiver Y (606).

Turning to FIG. 7, as shown by the key (700) and the sensing region (702), optical transmitters and optical receivers may be arranged in an opposing manner, such that optical transmitters are on a side of the sensing region (700) and optical receivers are on an opposite side of the sensing region (700). Similar to FIG. 6, optical transmitters may transmit simultaneously. In other words, optical transmitter X (704) transmits a coded signal in accordance with PN sequence X at the same time as optical transmitter Y (706) transmitting a coded signal in accordance with PN sequence Y. Thus, the resulting signals received by optical receiver J (708) include the aggregation of the effects of the transmissions from optical receiver X (704) and optical receiver Y (706).

FIG. 8 shows an example PN sequence transmissions in accordance with one or more embodiments of the invention. Specifically, FIG. 8 shows a timing diagram (800) of four optical transmitters (e.g., TX 1 (802), TX 2 (804), TX 3 (806), and TX 4 (808)) transmitting according to a PN code defined by a PN sequence. In the example, the PN sequence is a maximum length sequence that is cyclically shifted for each optical transmitter. Specifically, the PN code is +1, +1, +1, −1, −1, −1, −1, +1, −1, +1, −1, −1, +1, +1, −1. In the example, +1 is optically encoded as an off state followed by an on state while −1 is optically encoded as an on state followed by an off state. Thus, at time i (810), only optical transmitter TX 1 (802) is in an off state while the remaining optical transmitters are in an on state. At time i+1 (812), optical transmitters TX 1 (802) and TX 2 (804) are in an on state while the remaining optical transmitters are in an off state. Accordingly, an optical receiver receives effects from the on state of optical transmitters TX 2 (804), TX 3 (806), and TX 4 (808) at time i (810) and receives the effects from the on state of optical transmitters TX 1 (802) and TX 2 (804) at time i+1 (812). Based on the PN sequence and the aggregated input signals, the individual input signals resulting from a particular optical transmitter may be identified.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system for optical sensing, comprising:
    transmitter circuitry coupled a first optical transmitter and a second optical transmitter, the transmitter circuitry configured to:
        drive the first optical transmitter with a first optical coded signal based on a first code, and
        drive the second optical transmitter with a second optical coded signal based on a second code,
        wherein the first code and the second code are non-orthogonal,
        wherein the first code is a first pseudorandom noise (PN) code and the second code is a second PN code, and
        wherein the first optical transmitter and the second optical transmitter transmit at overlapping times; and
    a receiver circuitry coupled to an optical receiver and configured to receive a resulting signal comprising effects corresponding to the first optical coded signal and effects corresponding to the second optical coded signal,
    wherein the processing system is configured to:
        determine a first measurement between the first optical transmitter and the optical receiver based on the resulting signal and the first code,
        determine a second measurement between the second optical transmitter and the optical receiver based on the second code and the resulting signal, and
        determine a plurality of positional information for an input object based on the first measurement and the second measurement.

2. The processing system of claim 1, wherein the second PN code is a time delay of the first PN code.

3. The processing system of claim 1, wherein the first code comprises a maximum length sequence.

4. The processing system of claim 1, wherein the determination module is further configured to:
    determine an interference measurement based on the resulting signal.

5. The processing system of claim 3, wherein the determination module is further configured to:
    shift from driving the first optical transmitter with the first code to driving the first optical transmitter with a third code based on the interference measurement.

6. The processing system of claim 5, wherein the first code is a different length than the third code.

7. The processing system of claim 6, wherein the first optical transmitter and the second optical transmitter are in a plurality of optical transmitters that drive optical coded signals at the overlapping times, and wherein the transmitter module is further configured to:
- adjust a number of the plurality of optical transmitters that drive optical coded signals at the overlapping times based on the interference measurement.

8. A method for optical sensing, comprising:
- receiving a resulting signal comprising effects corresponding to a first optical coded signal transmitted from a first optical transmitter to a first optical receiver and effects corresponding to a second optical coded signal transmitted from a second optical transmitter to the first optical receiver, wherein the first optical coded signal is transmitted based on a first code, and the second optical coded signal is based on a second code, wherein the first code and the second code are non-orthogonal, and wherein the first optical transmitter and the second optical transmitter transmit at overlapping times;
- determining a first measurement between the first optical transmitter and the optical receiver based on the resulting signal and the first code;
- determining a second measurement between the second optical transmitter and the first optical receiver based on the second code and the resulting signal;
- determining a plurality of positional information for an input object based on the first measurement and the second measurement;
- determining an interference measurement for a first time period; and
- adjusting, based on the interference measurement, a number of a plurality of optical transmitters that transmit optical signals at overlapping times,
- wherein the first optical transmitter and the second optical transmitter are in the plurality of optical transmitters.

9. The method of claim 8, wherein the first code is a first pseudorandom noise (PN) code and the second code is a second PN code.

10. The method of claim 9, wherein the second PN sequence is a time delay of the first PN sequence.

11. The method of claim 8, wherein the first code is for the first time period.

12. The method of claim 11, further comprising:
- generating, based on the interference measurement, a third code for a second time period,
  - wherein the second code is a different length than the third code.

13. An input device comprising:
- a plurality of optical transmitters each configured to transmit an optical signal according to a non-orthogonal code of a first plurality of non-orthogonal codes during a first time period, wherein the plurality of optical transmitters transmit the optical signal during overlapping times in the first time period;
- a optical receiver configured to receive an aggregated input signal for the first time period,
  - wherein the aggregated input signal comprises the optical signal from the plurality of optical transmitters; and
- a processing system configured to:
  - determine, for each of the plurality of optical transmitters, an individual input signal from the optical transmitter using the aggregated input signal and the first plurality of non-orthogonal codes, and
  - create a second plurality of non-orthogonal codes based on an interference determined from the aggregated input signal, wherein the second plurality of non-orthogonal codes are a different length than the first plurality of non-orthogonal codes.

14. The input device of claim 13, wherein the processing system is further configured to adjust a number of the plurality of optical transmitters that simultaneously transmit the optical signal based on the interference determined from the aggregated input signal.

15. The input device of claim 13, wherein the input device is a frustrated total internal reflection device.

16. The input device of claim 13, wherein the plurality of non-orthogonal codes are based on maximal length sequences.

* * * * *